May 1, 1923.

W. E. GLASPEY

MACHINE FOR MAKING BOTTLES, ETC

Filed Dec. 8, 1921

INVENTOR
Warren E. Glaspey
BY
ATTORNEYS

May 1, 1923.

W. E. GLASPEY

MACHINE FOR MAKING BOTTLES, ETC

Filed Dec. 8, 1921

INVENTOR
Warren E. Glaspey
BY
ATTORNEYS

May 1, 1923.

W. E. GLASPEY 1,453,759

MACHINE FOR MAKING BOTTLES, ETC

Filed Dec. 8, 1921    6 Sheets-Sheet 4

Fig. 7.

INVENTOR
Warren E. Glaspey
BY
ATTORNEYS

May 1, 1923.
W. E. GLASPEY
MACHINE FOR MAKING BOTTLES, ETC
Filed Dec. 8, 1921
1,453,759
6 Sheets-Sheet 6

INVENTOR
Warren E. Glaspey
BY
ATTORNEYS

Patented May 1, 1923.

1,453,759

UNITED STATES PATENT OFFICE.

WARREN E. GLASPEY, OF BRIDGETON, NEW JERSEY, ASSIGNOR TO SPRING STOPPER COMPANY, OF NEW YORK, N. Y., A CORPORATION OF DELAWARE.

MACHINE FOR MAKING BOTTLES, ETC.

Application filed December 8, 1921. Serial No. 520,978.

*To all whom it may concern:*

Be it known that I, WARREN E. GLASPEY, a citizen of the United States, residing at Bridgeton, in the county of Cumberland and State of New Jersey, have invented a new and useful Improvement in Machines for Making Bottles, Etc., of which the following is a specification.

This invention relates particularly to machines for making bottles, or similar containers, which are provided within the mouth-portion with an internal screw thread; and the primary object of the invention is to provide an improved machine for the purpose indicated, which is capable of large output, which reduces wastage to a minimum, and which is economical in operation.

The invention is illustrated, in its preferred embodiment, in the accompanying drawing, in which—

It may be stated preliminarily that a bottle-making machine of the general type illustrated is known, such machine involving the use of a rotary mold carrier having invertible molds mounted on a carrier. The present invention relates particularly to the provision of means in connection with such machine whereby bottles having internally threaded mouth portions may be produced by means of such a machine. Certain of the features of improvement are adapted, however, for use in connection with bottle-making machines generally.

Also, it may be stated preliminarily that in the preferred construction herein illustrated the rotary mold carrier is equipped with revoluble mold-supports which serve to invert the molds and then right them as the molds are carried in their orbit; that a gear-equipped threaded mandrel is carried with each mandrel; that a pair of continuously rotating, oppositely revolving frictionally-mounted gears are employed at different stations, one of these gears being engaged by the gear elements of the mandrels, seriatim, to elevate the mandrels preparatory to the glass-charging operation and the other of said gears being engaged by the gear elements of the mandrels, in turn, and serving to lower the mandrels, in turn, at the bubble-blowing station; and that at the glass-charging station which is intermediate between the mandrel-elevating station and the bubble-blowing station, a blow-head is employed to force the glass down into the lower portion of the mold, so that it will form properly about the tip of the mandrel in the neck portion of the mold. Also in the illustration given an auxiliary gear element in the form of a shiftably mounted gear segment is employed to start the unscrewing movement of the mandrels when the glass in the mold is cooled sufficiently to render this desirable.

It may be added at this point that the bottle-blanks or parisons, are formed in the machine illustrated in the accompanying drawings; that the molds are, in the operation of the machine, inverted and opened and the parisons or bottle-blanks are transferred to a blowing machine; and that the final operation of blowing the bottles is performed in the machine last referred to, no illustration of such machine being required for the purpose of the description of the present invention.

In the embodiment of the invention illustrated, A represents the base of a frame from which rises a stationary shaft or column A'; B, a rotary mold-carrier having revolubly mounted thereon a series of mold-supports B', upon which are mounted the molds B²; B³, a large gear through the medium of which the mold-carrier B is rotated, so that the molds will be carried in an annular path or orbit; C and C' stationary cams which serve to open and close the molds; D, a stationary bevel-gear segment which serves to rotate the mold-supports and invert and then right the molds as they are carried through their orbit, E, a threaded tubular mandrel associated with each mold, each mandrel being equipped at its projecting lower end with a gear element E'; F, local gear mechanism comprising a continuously rotating mandrel-elevating gear element F' located at one station and a continuously rotating mandrel-lowering gear element F² located at another station, the gear elements F' and F² rotating in opposite directions; and G, an auxiliary mandrel-actuating device located at the intermediate station.

The frame which comprises the base A and column A' may be of any suitable construction. The fixed center column A' serves as an axis about which the mold-table B, actuated by the gear B³, turns; and the column A' serves also to support certain mechanisms, including the blow-head which is employed for blowing the glass down into the mold so that it will form properly about the tip of the mandrel in the neck portion of the mold. The blow-head employed for this purpose, which is of the usual construction, is designated H.

The mold-table is given an intermittent or step-by-step movement in any desired manner. The mold-carrying means comprises the table B and the series of mold supports B' arranged thereon. Each mold-support comprises a hollow trunnion or gudgeon 1 and a disk or face-plate 1ª formed integrally therewith. The hollow trunnion 1 is journaled in a divided bearing-box 2 which is securely fastened to the table B.

Each mold B² comprises a pair of main mold sections 3 and a pair of ring-mold sections 3ª. These sections meet in a vertical plane and are provided with arms 3ᶜ and 3ᵇ, respectively, which are connected at their inner ends with a pivot 4 carried by lugs 4ª which project from the face-plate 1ª. Thus, the mold sections are capable of separating at a plane containing the axis of the mold.

The threaded mandrel or plunger E, associated with each mold, works in a nut 5 which is rigidly secured to a bracket 5ª, the bracket 5ª being rigidly mounted on the face-plate of the mold-support B'. The bracket 5ª comprises a tubular member 5ᵇ carried by a shank 5ᶜ; and a pair of strong studs or bolts 5ᵈ which project from the face-plate of the mold-support B'. The shank 5ᶜ of the bracket is equipped with loops or rings 5ᵉ which are mounted on the laterally projecting studs 5ᵈ. The tubular portion 5ᵇ of the bracket is thus strongly supported on the studs 5ᵈ and may be adjusted thereon, if desired. Any suitable securing means (not shown) may be employed. The tubular portion 5ᵇ of the bracket is located directly below the mold and is provided at its upper portion with a peripheral flange 5ᶠ which interlocks with flanges with which the ring-sections 3ª of the mold are provided. The nut 5 has a portion which projects into the tubular member 5ᵇ and has a flange 5ᵍ which is secured by bolts (not shown) to the tubular member 5ᵇ.

The gear E' carried by the lower end of the mandrel is equipped on its upper side with a stud 6 which coacts with the stud 6ª depending from the nut 5 to limit the rotation of the mandrel in its upward movement; and the gear E' is further provided on its lower side with a stud 7 which coacts with a stop or finger 7ª carried by the nut 5, the members 7 and 7ª serving to limit the rotation of the mandrel at the end of its downward movement.

In the operation of the machine, the mandrels are elevated, in turn, by the continuously rotating gear F', which is, however, capable of slippage after the mandrel has reached the limit of its upward movement. The mandrels are elevated at a station designated S¹ on the drawings; the glass-charging operation and the operation of blowing the glass down into the lower portion of the mold is performed at the station designated S²; and the complete withdrawal of the mandrels is effected by the gear F² at a station designated S³. The reverse or unscrewing movement of the mandrels is started, however, by the device G, during the passage of the mold from the station S² to the station S³.

Figures 1, 2, 3:
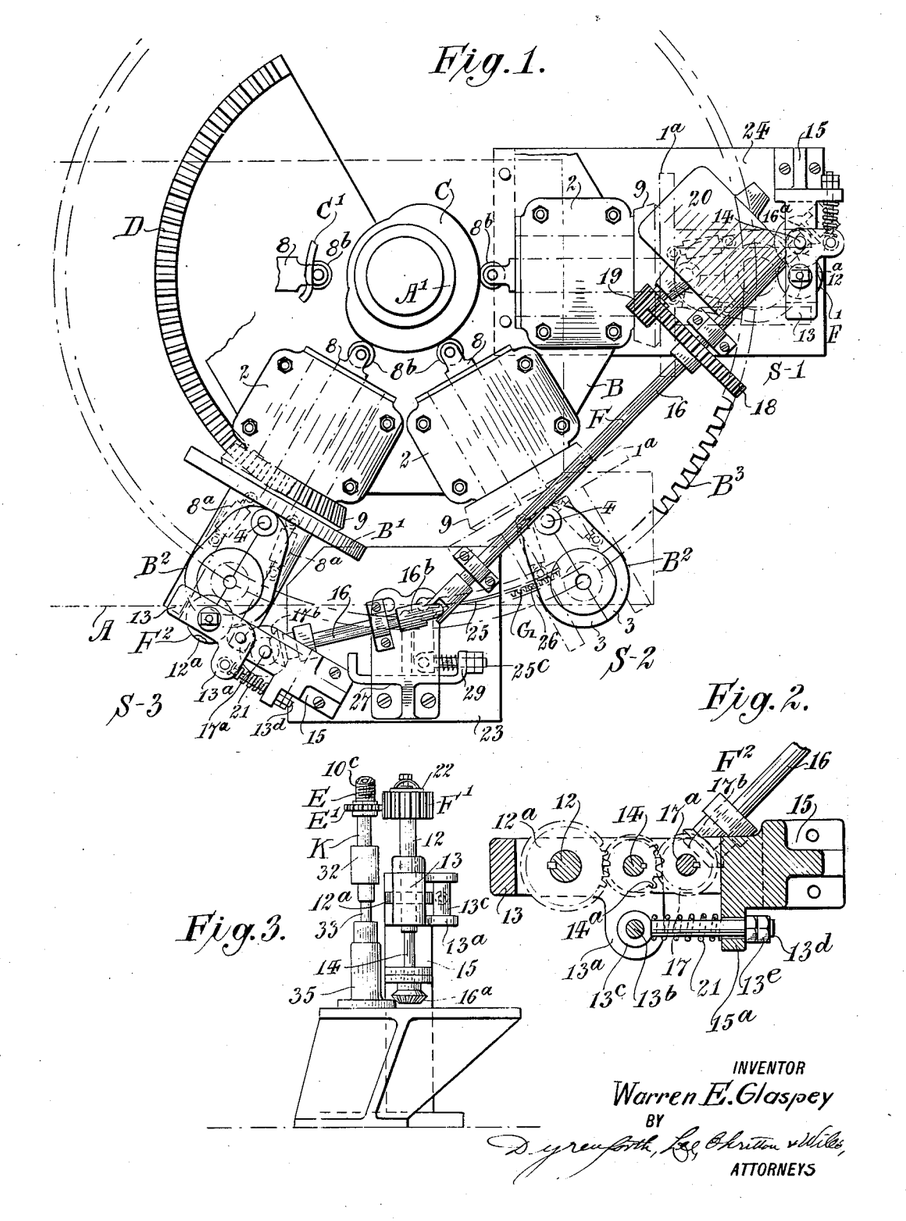
Figure 1 represents a broken plan view of a bottle-making machine embodying the invention.
Fig. 2, a broken plan sectional view taken as indicated at line 2 of Figs. 3 and 5, this view showing one of the local gear mechanisms employed for actuating the mandrels.
Fig. 3, a broken elevational view of such local gear mechanism, this view showing also the lower end of one of the mandrels and the bubble blow-head which is employed for producing a cavity in the parison, or bottle-blank.
Figure 4:
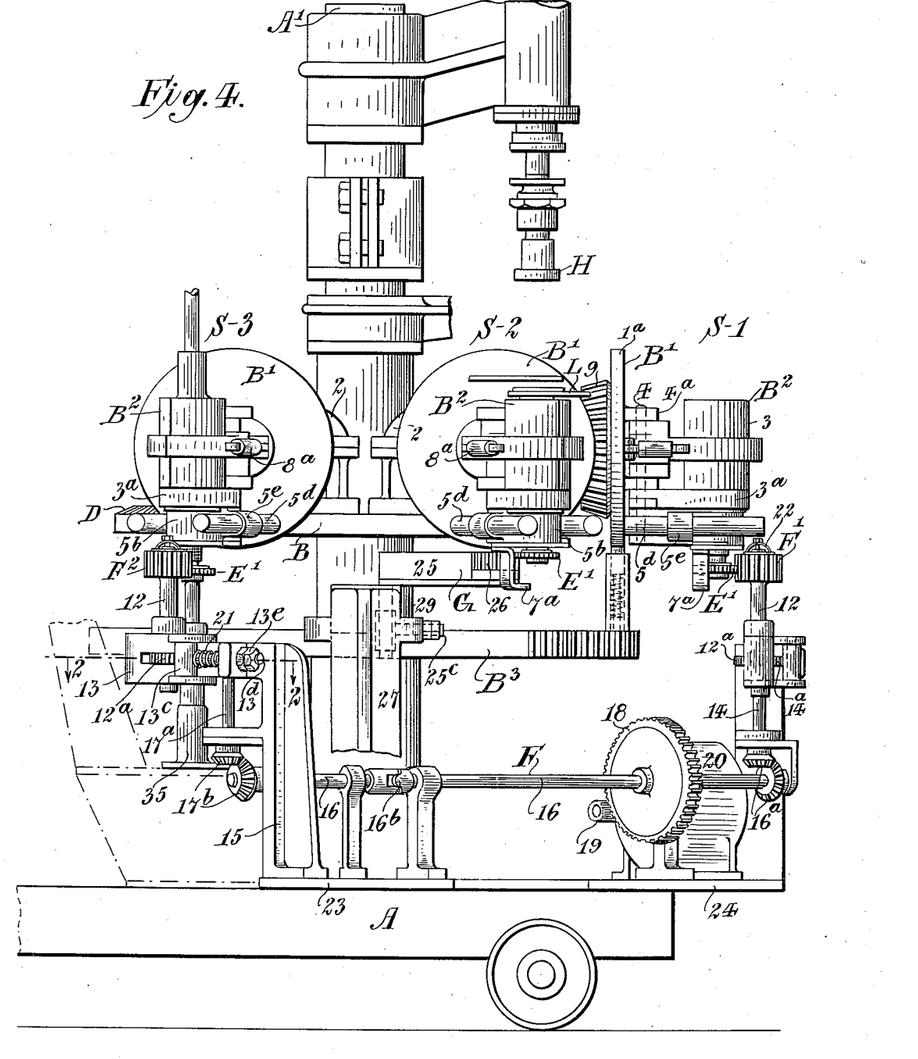
Fig. 4, a broken elevational view of the machine.
Figures 9, 10, 11, 12, 13:
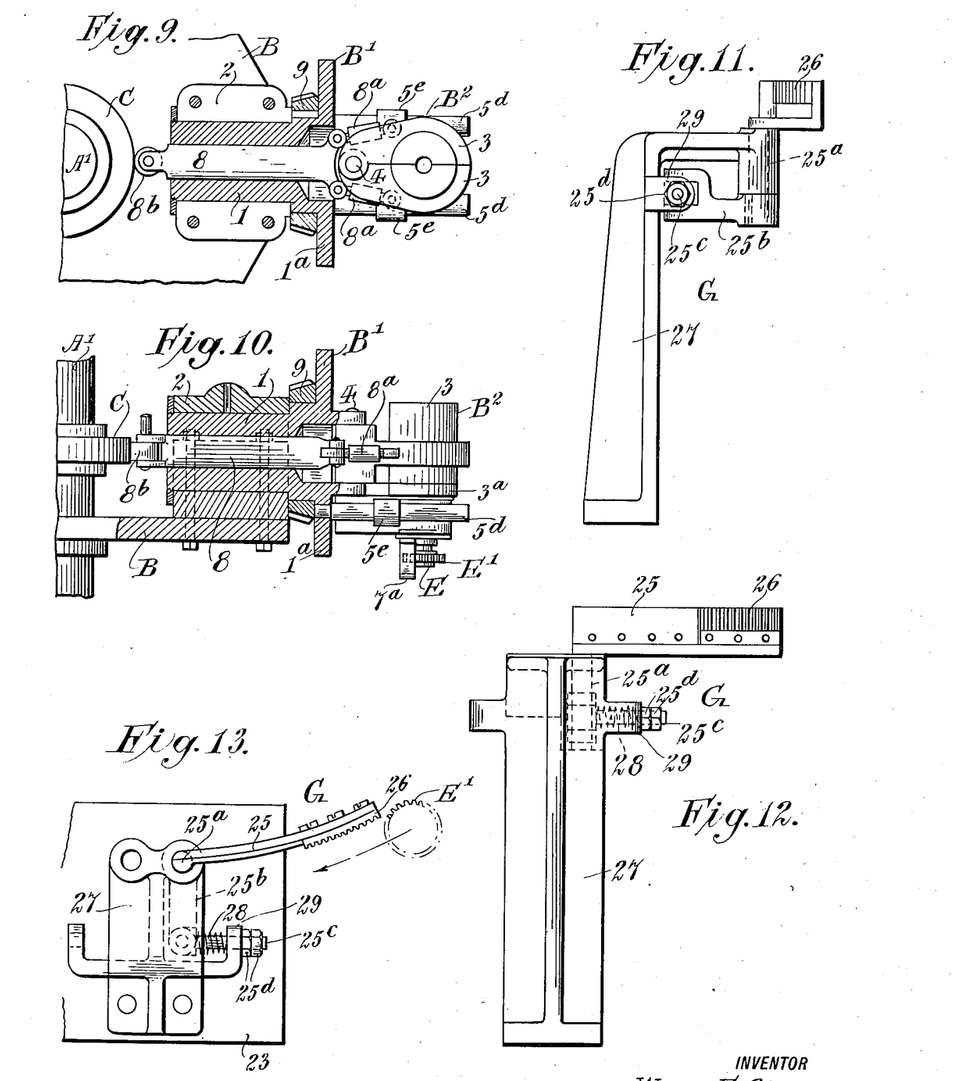
Fig. 9, a broken plan sectional view illustrating the manner in which the molds are mounted on the rotary mold-table.
Fig. 10, a vertical sectional view of the same.
Fig. 11, a side elevational view of an auxiliary mandrel-lowering device.
Fig. 12, a front elevational view of the device shown in Fig. 11.
Fig. 13, a plan view of said device.

As will be best understood from Figs. 9 and 10, the mold-sections are opened and closed thru the medium of a plunger 8 which extends thru the hollow trunnion 1 of the mold-support, the outer end of the plunger being connected, by links 8ª, with the mold-sections. Each plunger 8 is equipped at its rear or inner end with a cam roller 8ᵇ; and the movements of the plunger 8 are controlled by the cams C and C', as indicated in Fig. 1.

On the hollow trunnion 1 of the mold-support is secured a bevel gear 9. These bevel gears are adapted to travel on the bevel-rack D and revolve the mold-supports on their axes during the rotation of the mold-table B. The rack D is a stationary rack, supported in any suitable manner (details not shown). The molds may be maintained in their normal upright position by any suitable expedient (not shown). If desired, frictional contact between the trunnion 1 of the mold-support and the sectional bearing-box may be such as to cause the bearing-box to grip the trunnion of the mold-support sufficiently to maintain the mold in its upright position during the passage of the molds from the station $S^1$ to the station $S^3$. Any suitable locking devices may be employed for releasably locking the molds in upright position, so that they will be properly maintained in such position during their travel in the upright position.

Each mandrel E preferably comprises a tubular shank portion 10 and a tip portion $10^a$, which is provided with a thread $10^b$. The thread $10^b$ corresponds in pitch with the pitch of the thread $10^c$ between the stem 10 and the nut 5. The tip portion $10^a$ is provided with a tubular shank $10^d$ and a collar $10^e$. Air may pass thru the tubular shanks 10 and $10^d$ and out thru radial openings $10^f$, thus gaining access to the chamber 11 above the nut 5. The chamber 11 communicates thru a central passage $11^a$ with the neck portion of the mold cavity. Thus, when the mandrel is retracted air may pass from the bubble-blower into the cavity in the glass and blow the glass to complete parison form.

Figures 5, 6:
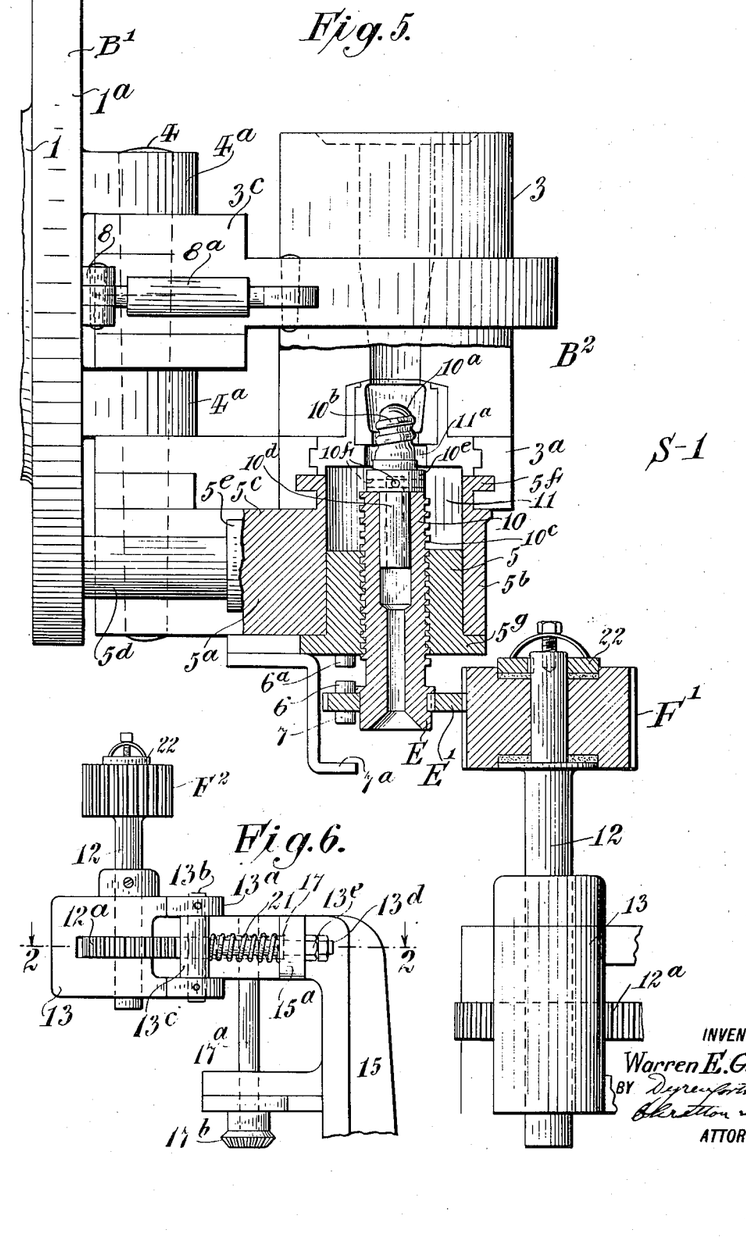
Fig. 5, a broken view, partly in section and partly in elevation, showing one of the molds at the mandrel-elevating station and showing also a portion of the local gear mechanism which serves to elevate the mandrels, seriatim.
Fig. 6, a broken elevational view of the local gear mechanism which serves to lower the mandrels.
Figure 7:
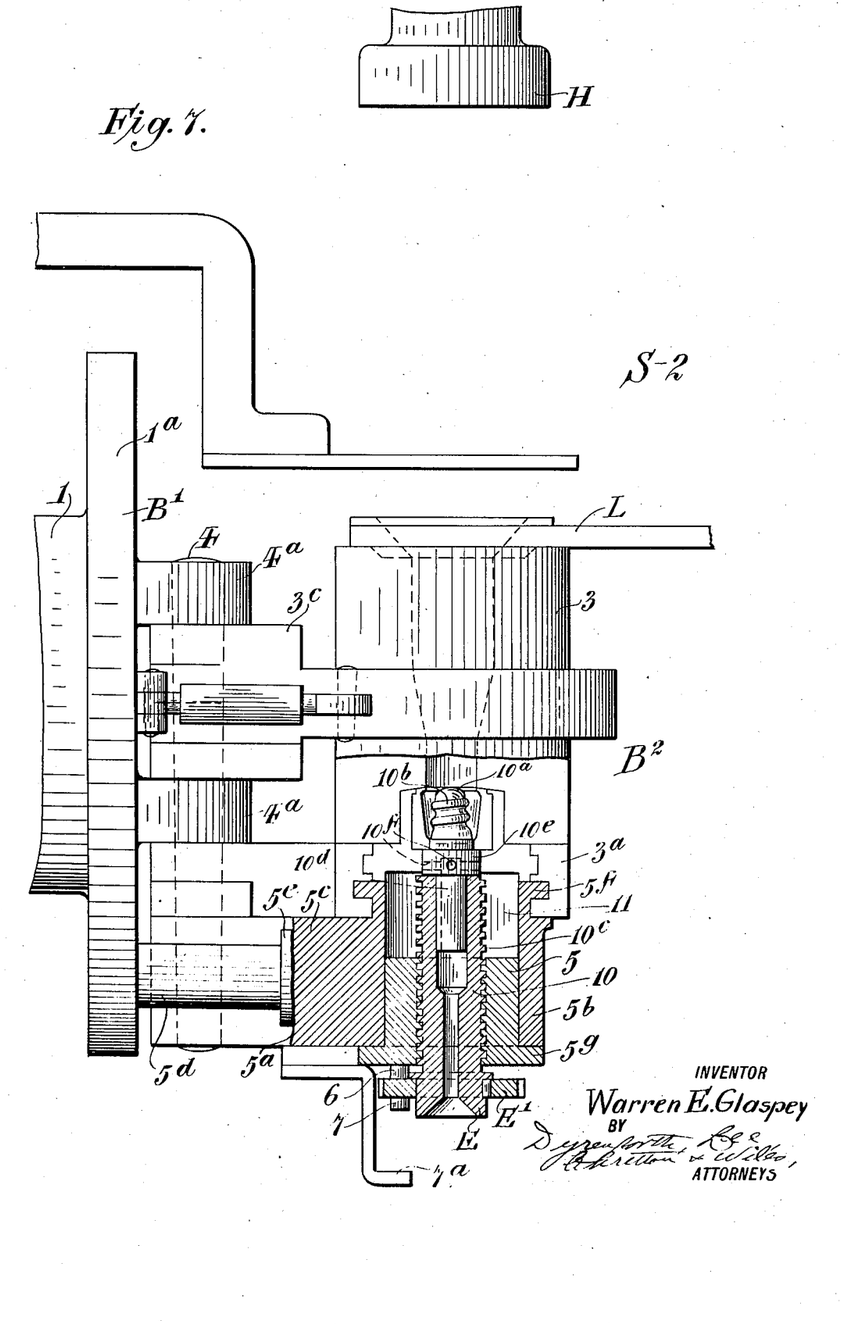
Fig. 7, a broken elevational view, partly in section, showing one of the molds at the station which is intermediate between the mandrel-elevating station and the bubble-blowing station, this intermediate station being the station where the molten glass or "metal" is forced down into the mold so as to properly fill the space in the "ring-molding" or neck-forming portion of the mold, about the threaded tip of the mandrel.

The local gear mechanism F, which includes the mandrel elevating gear F' and the mandrel lowering gear $F^2$ will now be more fully described. Each of the gears just mentioned is located adjacent to the annular path of the gears E' carried by the mandrels; and each of the gears F' and $F^2$ is shiftably mounted and yieldingly held to enable the gears E' to come properly into mesh. Each of the gears F' and $F^2$ is frictionally held on the upper end of a vertical shaft 12, which is journaled in an angle-form movable bracket 13 mounted to swing about an axis 14 carried by the laterally turned upper end of a standard 15. The lower end of each shaft 12 is equipped with a pinion $12^a$ which is actuated by a pinion $14^a$. In the case of the gear mechanism at the station $S^1$, the gear $14^a$ is mounted on a vertical shaft 14 which is driven directly from a horizontal shaft 16, motion being communicated thru bevel-gears $16^a$. In the case of the gear mechanism at the station $S^3$, the gear $14^a$ is an idler and is actuated by a gear 17 (Figs. 2 and 6), which is mounted on the upper end of a shaft $17^a$ whose lower end is equipped with a bevel pinion meshing with a bevel pinion on a section of the horizontal shaft 16, these bevel pinions being designated $17^b$. The shaft 16 is shown provided with a universal joint $16^b$ connecting its sections. The shaft 16 is equipped with a gear 18 driven by a pinion 19 on the shaft of an electric motor 20.

The pivoted bracket 13, in each case, is provided with an arm $13^a$ equipped with a pivot pin $13^b$, upon which is journaled a tubular head $13^c$ of a bolt $13^d$ which extends thru a lug $15^a$ with which the upper end of the standard 14 is equipped. A spring 21 is confined between the lug $15^a$ and the tubular head $13^c$ of the bolt. The bolt works freely thru an opening in the lug $15^a$. This will be readily understood from Fig. 2. The bolt $13^d$ is equipped with nuts $13^e$ so that the pivoted bracket 13 will be held normally in the position shown in Fig. 2. It may yield, however, in case the teeth of the mandrel-carried gear E' fail to come properly into mesh with the teeth of the gear $F^2$, thus preventing breakage. In a similar manner, the gear F' is capable of shifting to enable the teeth of the gears E' to come properly into mesh. The gears F' and $F^2$ are frictionally secured on the shafts 12 by means of the friction device 22 shown in detail in Fig. 5.

The brackets 15 of the gear mechanism F are mounted on plates 23 and 24 which are, in turn, mounted on the base of the frame A.

The auxiliary mandrel-actuating device G is shown in detail in Figs. 11—13. It comprises a segmental arm 25 upon which is adjustably mounted a gear segment or rack 26. The arm 25 is carried by a pivot $25^a$ journaled in the upper end of the standard 27. The lower end of the pivot $25^a$ has secured thereto an arm $25^b$ with which is connected an eye-bolt $25^c$. On the eye-bolt $25^c$ is confined a spring 28 which is disposed between the arm $25^b$ and a perforate lug 29 carried by the standard 27. The bolt $25^c$ is equipped with nuts $25^d$. Thus, the gear segment 26 is yieldingly held in the position shown in Fig. 13, where it is adapted to be engaged by the mandrel gears E' during the passage of the molds from the station $S^2$ to the station $S^3$. The rack 26 may have any suitable number of teeth, one or more. The chief purpose is to loosen the mandrels from the glass when the glass has become sufficiently hardened to permit this to be done, and before the glass has hardened to a point which might make it difficult to release the thread of the mandrel from the thread formed in the glass. Ordinarily, the rack 26 would not be of sufficient length to turn the mandrel completely down. The completion of the retraction of the mandrel is effected by the gear $F^2$ at the station $S^3$. It will be understood that after the mandrel has been completely elevated or completely lowered, the gear $F'$ or $F^2$ will slip on the shaft 12. This slippage is necessary in order to prevent breakage when the mandrel reaches the limit of its movement. If desired, the device G may be dispensed with. In the illustration given, the bracket 27 is shown formed double so that if desired another yieldingly held rack can be mounted thereon.

At the station $S^3$ is located the bubble blow-head K. This is shown in detail in Fig. 8. It comprises the pipe 30 equipped with a vertical head 31 on which is swiveled a vertical tip 32. A depending stem 33 carries the device K, this stem being equipped with a piston 34 working in a cylinder 35. The bubble blow-head K is elevated by pneumatic pressure. The blow-head rises above the position shown in Fig. 8 and is then depressed by the mandrel, the tip portion 32 of the device K rotating with the mandrel. This action is permitted by a ball-bearing 36. The pneumatic pressure which raises the piston 34 is sufficiently light to enable the blow-head to be depressed by the mandrel as the mandrel descends until the stud 7 engages the stop $7^a$.

It may be remarked that in the illustration given the mandrel-gears $E'$ are rigidly connected with the mandrels, while the gears $F'$ and $F^2$ are frictionally connected with their spindles. If desired, however, the arrangement may be modified so that the necessary slippage will occur between the gears $E'$ and the mandrels after the mandrels have completed their longitudinal movements. In such cases, rack devices, such as the device G might be employed for rotating the mandrels, both for the purpose of elevating and lowering the mandrels. This would enable the gear mechanism F to be dispensed with, assuming the racks employed to be of sufficient length to rotate the mandrels the necessary distance.

The operation of the improved machine may be stated briefly, as follows:

The mold table B is given an intermittent movement of rotation in the usual manner. When the molds reach the station $S^1$, the gear $F'$ engages the mandrel-gears, seriatim, and elevates the mandrels in turn. When the mold reaches the station $S^2$, the operation of introducing the "metal," or molten glass, is performed, a funnel L, being employed, if desired, to facilitate this operation. In practice, a suitable automatic charging device is employed. After the requisite amount of glass is introduced, the blow-head H descends, and air pressure is exerted upon the glass in the mold, thus forcing the metal to form properly about the mandrel in the neck-portion of the mold. As the mold is carried from the station $S^2$ to the station $S^3$, the mandrel-gear is engaged by the yielding rack G, this auxiliary gear device serving to effect an initial loosening of the mandrel from the glass and a partial lowering of the mandrel. When the mold reaches the station $S^3$, the gear, $F^2$ completes the lowering action of the mandrel. Before the mandrel is completely lowered, however, the bubble blower K, shown in Fig. 8, rises to meet the mandrel, but is forced back again against the air pressure during the final portion of the lowering movement of the mandrel. When the mandrel is completely lowered, the air enters the chamber 11 and passes through the passage $11^a$ into the cavity previously formed in the glass by the mandrel tip, and the glass is blown into the form of a complete parison. It may be remarked that the pitch of the thread on the tip of the mandrel is the same as that of the thread which connects the shank of the mandrel with the nut 5.

After the parison has been blown, the mold carries it from the station $S^3$. The mold, in the course of its travel, is rotated with the horizontal trunnion of the mold support to invert the parison. Also, the mold is opened, and the parison is transferred to the blowing machine, where the operation of blowing the complete bottle is performed.

Figure 8:
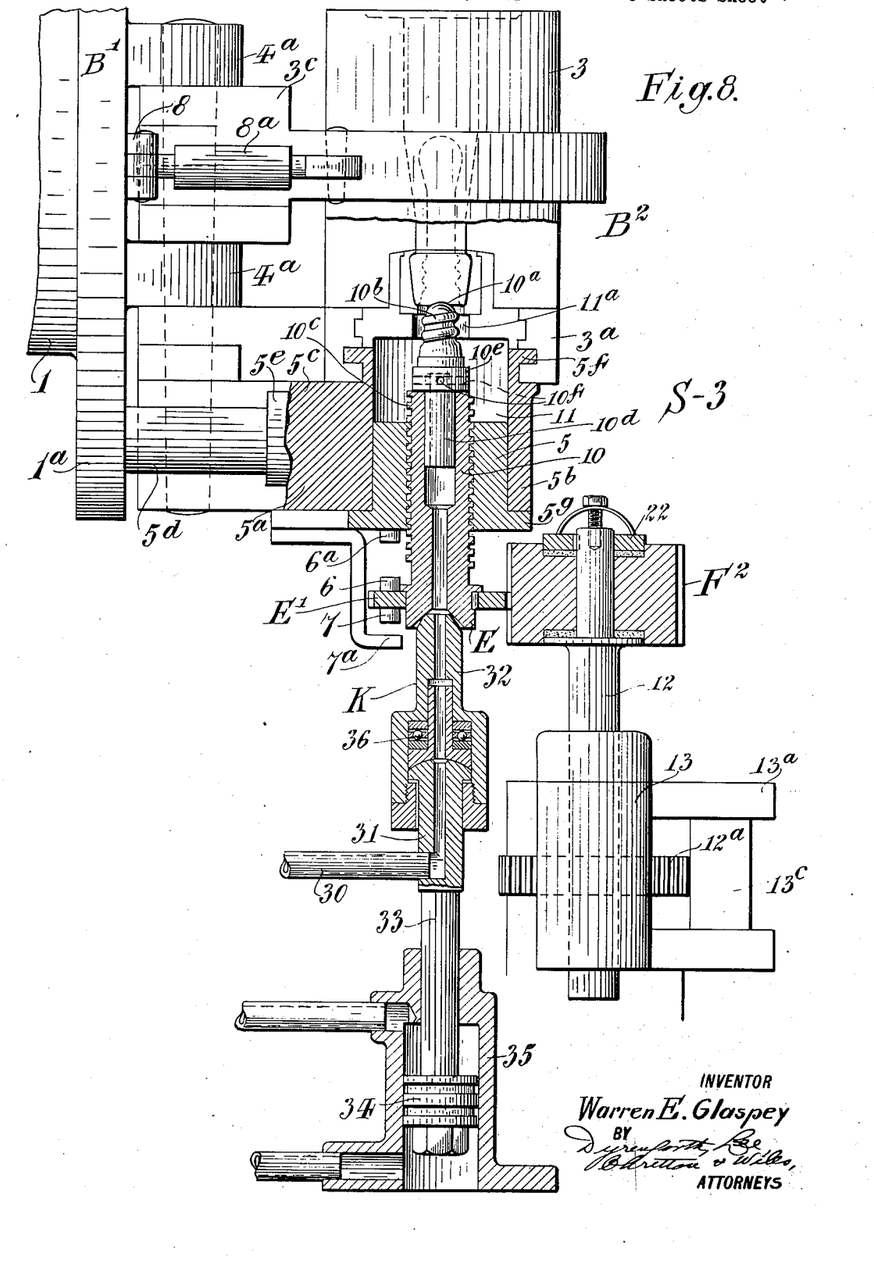
Fig. 8, a view partly in section and partly in elevation, showing one of the molds at the bubble-blowing station, the mandrel having been lowered to admit air to the interior of the parison or bottle-blank.

It will be noted, by reference to Fig. 8, that the blow-head K has the upper end of its tip rounded, and the lower end of the mandrel is correspondingly concave, so that a practically air tight joint will be formed between the tubular mandrel and the bubble blow-head.

The improved machine operates in the same automatic manner as do machines of this type employed for making bottles having plain, or unthreaded interior mouth surfaces; and the improved machine is capable of the usual large output of an automatic machine of this type. Thus, bottles of merchantable character can be produced economically and in large quantities, such bottles being provided in their mouth portions with internal threads.

The foregoing detailed description has been given for clearness of understanding only, and no unnecessary limitations should be understood therefrom, it being the intent to claim the invention as fully as possible in view of the prior art.

What I regard as new, and desire to secure by Letters Patent, is:—

1. In a machine of the character set forth, the combination of a mold-carrier adapted to carry molds in an orbital path, a series of invertible molds mounted on said carrier, means for inverting and righting the molds, a nut mounted in alignment with each mold, a mandrel for each mold having a threaded tip adapted to extend into the mold-cavity and having a threaded shank engaging the corresponding nut, a mandrel-gear mounted on the projecting end of each mandrel, local gear means for engaging the mandrel-gears, seriatim and rotating the mandrels to elevate them, and local gear means serving to engage the mandrel-gears seriatim and effect lowering of the mandrels after the glass has been introduced into the molds.

2. In a machine of the character set forth, the combination of a rotatory mold carrier, a series of mold supports equipped with trunnions journalled in said carrier, means for inverting and righting the molds, molds mounted on said mold supports, means for opening and closing said molds, a nut mounted on each mold support, a threaded mandrel working through each nut and having its lower end equipped with a gear, local gear mechanism serving to rotate the mandrel-gears and thereby elevate the mandrels, seriatim, a blow-head serving to force the glass, after the charging operation, toward the lower portion of the mold, and local gear mechanism serving to engage the mandrel-gears and lower the mandrels, seriatim, after the operation of said blow-head.

3. In a machine of the character set forth, the combination of a rotatory mold carrier, a series of mold-supports equipped with trunnions journalled in said carrier, means for inverting and righting the molds, molds mounted on said mold-supports, means for opening and closing said molds, a nut mounted on each mold-support, a threaded mandrel working through each nut and having its lower end equipped with a gear, local gear mechanism serving to rotate the mandrel-gears and thereby elevate the mandrels, seriatim, and a 'bubble blow-head adapted to deliver compressed air to the cavity formed by the mandrel tip in the glass and cause the glass to be blown to form the parison.

4. In a machine of the character set forth, the combination of a rotatory mold carrier, a series of invertible molds mounted on said carrier, means for inverting and righting the molds, a nut carried with each mold, a tubular mandrel working through said nut, a chamber being provided between said nut and the mold-cavity, said mandrel having a passage leading through it and opening into said chamber, a blow-head for forcing the glass, after the charging operation, into the lower portion of the mold, and a bubble blow-head disposed beneath the path of the mandrels and adapted to engage the lower ends of the mandrels, in turn, and admit air pressure through the mandrels.

5. In a machine of the character set forth, the combination of a rotatory carrier, a series of independently rotatable mold-supports mounted on said carrier, a nut carried by each mold-support, a mold mounted on each mold-support above said nut, a tubular mandrel working through each nut and having its lower end portion equipped with a gear, local gear mechanism adapted to be engaged in turn by the mandrel-gears and serving to elevate the mandrels preparatory to the glass charging operation and to lower the mandrel after the pressing operation, a blow-head mounted above the path of said molds and serving to force the glass toward the lower portions of the molds, and a bubble blow-head mounted beneath the path of the mandrels and serving to admit air through the mandrels, in turn.

6. In a machine of the character set forth, the combination with a mold carrier and a series of molds carried thereby, of a mandrel for each mold having screw connection with the mold carrier and provided with a threaded extremity adapted to project into the mold-cavity, a gear element on each mandrel, a bodily shiftable, yieldingly held, local gear element adapted to be engaged by the gear elements of the mandrels in turn and serving to elevate the mandrels, and a shiftably-mounted, yieldingly held gear element adapted to be engaged by the gear elements of the mandrels in turn, and serving to lower the mandrels.

7. In a machine of the character set forth, the combination with a mold carrier and a series of molds carried thereby, of a mandrel for each mold having screw connection with the mold carrier and provided with a threaded extremity adapted to project into the mold, a gear element on each mandrel, and a pair of oppositely rotating local gears located at the different stations, one of said local gears serving to elevate the mandrels and the other serving to lower the mandrels, said local gear elements being bodily shiftable and yieldingly held, thereby permitting the gear elements of the mandrels to come into proper mesh with the local gear elements.

8. In a machine of the character set forth, the combination of a rotary carrier equipped with a series of molds, nuts mounted on said carrier, threaded mandrels working through said nuts, pivotally mounted, yieldingly held brackets located at different stations, rotating shafts journalled in said brackets, and gear elements mounted on said shafts and adapted to be engaged by the gear elements of the mandrels, in turn.

9. In a machine of the character set forth, the combination of a rotary carrier equipped with a series of molds, nuts mounted on said carrier, threaded mandrels working through said nuts, pivotally mounted, yieldingly held brackets located at different stations, rotating shafts journalled in said brackets, and gear elements mounted on said shafts and capable of slippage with respect thereto, and adapted to be engaged by the gear elements of the mandrels, in turn.

10. In a machine of the character set forth, the combination with a mold carrier and a series of molds carried thereby, of a mandrel for each mold having screw connection with the mold carrier and provided with a threaded extremity adapted to project into the mold, a gear element on each mandrel, a pair of oppositely rotating local gear elements located at different stations, one of said local gear elements being adapted to elevate the mandrels, and the other adapted to lower the mandrels, in turn, a blow-head located above the path of the molds, and a yieldingly-mounted rack adapted to engage the gear elements of the mandrels and effect the initial portion of the lowering movement during the progress of the mold from the station where said blow-head is located, to the bubble-blowing station.

11. In a machine of the character set forth, the combination with a mold carrier and a series of molds carried thereby, of a mandrel for each mold having screw connection with the mold carrier and provided with a threaded extremity adapted to project into the mold, a gear element on each mandrel, a pair of oppositely rotating local gear elements located at different stations, one of said local gear elements being adapted to elevate the mandrels, and the other adapted to lower the mandrels, in turn, a blow-head located above the path of the molds, and a shiftably mounted, yieldingly held rack adapted to engage the gear elements of the mandrels and effect the initial portion of the lowering movement during the progress of the mold from the station where said blow-head is located, to the bubble-blowing station.

12. In a machine of the character set forth the combination of a rotary mold table, a series of independently rotatable mold-supports carried thereby, molds mounted on said mold-supports, nuts mounted on said mold-supports beneath said molds, threaded tubular mandrels working through said nuts and having tip portions equipped with threads, gear elements mounted on the lower portions of said mandrels, a bubble blow-head located beneath the path of said mandrels and adapted to be elevated to admit air through the mandrels, and local gear devices located at different stations, one of said gear devices serving to elevate the mandrels and the other serving to lower the mandrels.

13. In a machine of the character set forth the combination of a rotary mold table, a series of bearings mounted on said table, trunnions mounted in said bearings and equipped with vertical face plates and affording mold-supports, said trunnions being equipped with gears, a rack serving to engage said gears and rotate said mold-supports, sectional molds mounted on said face plates, plungers working through said trunnions and serving to open and close the molds, brackets mounted on said face plates and equipped with nuts disposed beneath the molds, chambers being provided above said nuts communicating with the mold-cavities, threaded tubular mandrels working through said nuts, and equipped at their upper ends with threaded tips adapted to extend into the mold-cavities, and equipped at their lower ends with gears, said mandrels having passages leading therethrough and opening into said chambers, means for limiting the rotation of said mandrels in each direction, a local gear device located at one station and serving to engage the mandrel-gears in turn and elevate the mandrels, a local gear device located at another station and serving to engage the mandrel gears and lower the mandrels, in turn, a blow-head located above the path of the molds at an intermediate station and adapted to force the glass toward the lower portions of the molds, and a bubble blow-head located beneath the path of the mandrels and adapted to engage the mandrels in their lowered position and admit pressure to said chambers.

14. In a machine of the character set forth, the combination with a mold carrier and a series of molds carried thereby, of a mandrel for each mold having screw connection with the mold carrier and provided with a threaded extremity adapted to project into the mold-cavity, a gear element on each mandrel, and local gear mechanism comprising a pair of bodily shiftable, yieldingly held gears adapted to be engaged, in turn, by the gears of the mandrels, a motor, and gear connections between said motor and said shiftably mounted gears and serving to rotate them in opposite directions.

15. In a machine of the character set forth, the combination of a rotary mold table, a series of molds carried thereby, nuts carried with said molds, threaded mandrels working through said nuts and equipped at their lower ends with gears, and a yieldingly held, pivotally mounted rack adapted to be engaged by said gears, in turn.

WARREN E. GLASPEY.